United States Patent
Endo (10) Patent No.: US 9,736,485 B2
(45) Date of Patent: Aug. 15, 2017

(54) ENCODING APPARATUS, ENCODING METHOD, AND IMAGE CAPTURE APPARATUS

(71) Applicant: CANON KABUSHIKI KAISHA, Tokyo (JP)

(72) Inventor: Hiroaki Endo, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 296 days.

(21) Appl. No.: 14/581,359

(22) Filed: Dec. 23, 2014

(65) Prior Publication Data
US 2015/0189301 A1  Jul. 2, 2015

(30) Foreign Application Priority Data
Dec. 27, 2013  (JP) .................... 2013-273180

(51) Int. Cl.
| | | |
|---|---|---|
| *H04N 19/176* | (2014.01) | |
| *H04N 19/117* | (2014.01) | |
| *H04N 19/157* | (2014.01) | |
| *H04N 19/82* | (2014.01) | |

(52) U.S. Cl.
CPC ......... *H04N 19/176* (2014.11); *H04N 19/117* (2014.11); *H04N 19/157* (2014.11); *H04N 19/82* (2014.11)

(58) Field of Classification Search
CPC .... H04N 19/176; H04N 19/117; H04N 19/82; H04N 19/157
See application file for complete search history.

(56) References Cited

U.S. PATENT DOCUMENTS

| | | | | |
|---|---|---|---|---|
| 9,307,246 B2* | 4/2016 | Oh | ...................... | H04N 19/176 |
| 9,438,914 B2* | 9/2016 | Sakamoto | ............ | H04N 19/103 |
| 9,462,288 B2* | 10/2016 | Alshina | ................ | H04N 19/189 |
| 9,485,521 B2* | 11/2016 | Lim | ....................... | H04N 19/82 |
| 9,497,455 B2* | 11/2016 | Yamazaki | .............. | H04N 19/70 |
| 2006/0286213 A1* | 12/2006 | de Levita | ................. | A21D 6/00 426/94 |
| 2013/0051454 A1* | 2/2013 | Sze | ......................... | H04N 19/70 375/240.02 |
| 2013/0136173 A1* | 5/2013 | Matsunobu | ...... | H04N 19/00945 375/240.08 |
| 2013/0182759 A1* | 7/2013 | Kim | ....................... | H04N 19/82 375/240.02 |
| 2014/0140406 A1* | 5/2014 | Yu | .......................... | H04N 19/70 375/240.16 |

(Continued)

FOREIGN PATENT DOCUMENTS

JP  2012-005113 A  1/2012

*Primary Examiner* — Tsion B Owens
(74) *Attorney, Agent, or Firm* — Cowan, Liebowitz & Latman, P.C.

(57) ABSTRACT

An encoding apparatus includes a dividing unit that divides a target image included in an image into coding blocks, an encoding unit that encodes the target image including the coding blocks, a generating unit that generates a locally decoded image from the encoded target image, a filtering unit that applies a predetermined filtering to the locally decoded image, and a determination unit that determines, based on whether a predetermined condition is satisfied or not, whether a band offset process is applied to the locally decoded image or an edge offset process is applied to the locally decoded image.

12 Claims, 8 Drawing Sheets

(56) References Cited

U.S. PATENT DOCUMENTS

| | | | |
|---|---|---|---|
| 2014/0140416 A1* | 5/2014 | Yamazaki | H04N 19/70 375/240.25 |
| 2014/0192869 A1* | 7/2014 | Laroche | H04N 19/00066 375/240.12 |
| 2014/0286396 A1* | 9/2014 | Lee | H04N 19/70 375/240.02 |
| 2016/0127747 A1* | 5/2016 | Hsiang | H04N 19/70 375/240.29 |
| 2016/0286213 A1* | 9/2016 | Lee | H04N 19/117 |
| 2016/0337656 A1* | 11/2016 | Alshina | H04N 19/189 |
| 2017/0006283 A1* | 1/2017 | Zhou | H04N 19/1883 |

* cited by examiner

ENCODING APPARATUS, ENCODING METHOD, AND IMAGE CAPTURE APPARATUS

BACKGROUND

Field of the Invention

The present invention relates to an image encoding apparatus, an image encoding method, and an image capture apparatus.

Description of the Related Art

Currently, a digital appliance that can record a moving image such as a digital video camera and a hard disk recorder is widely available. Such digital appliance performs compression encoding of moving image data in order to efficiently record a moving image in a recording medium such as a flash memory and a hard disk.

H.264 coding scheme is a typical example of moving image compression coding schemes. The H.264 coding scheme is a widely used moving image compression coding scheme because it is employed in AVCHD, which is a high definition recording scheme for video cameras, and is also employed in one-segment terrestrial digital broadcasting. AVCHD is the abbreviation of Advanced Video Codec High Definition.

In recent years, 4K television sets are introduced in the market. With such a trend toward higher definition moving images and higher frame rate, demand is increasing for further improvement in the compression efficiency of a moving image.

HEVC (High Efficiency Video Coding) coding scheme, which is a successor to the H.264 coding scheme and is a more highly efficient moving image compression coding scheme, has been designated as an international standard. The HEVC coding scheme is a moving image compression coding scheme that has a compression efficiency approximately twice as high as that of the H.264 coding scheme, is expected to be used in next-generation moving image digital appliances, and thus is likely to be widely used in the future.

As an encoding tool that is newly employed in the HEVC coding scheme, there is a technique called an adaptive offset process (SAO: Sample Adaptive Offset). The adaptive offset process is performed on a decoded image that has undergone deblocking filtering, and contributes to achieving higher image quality in the HEVC coding scheme (Japanese Patent Laid-Open No. 2012-5113).

The adaptive offset process includes a band offset process and an edge offset process. At the time of encoding, an encoding apparatus determines which one of the band offset process and the edge offset process is to be performed, or determines none of them is to be performed, per a CTU (Coding Tree Unit). The encoding apparatus determines a band position and an offset value if it is determined that the band offset process is to be performed, or an edge direction and an offset value if it is determined that the edge offset process is to be performed, and performs encoding of these parameters.

When determining parameters of the adaptive offset process at the time of encoding, a process for checking the band position or the edge direction on a pixel-by-pixel basis and calculating an appropriate offset value is performed. Accordingly, a problem arises in that a significant amount of processing is required to perform such process on all patterns of the adaptive offset process to calculate an evaluation value corresponding to each pattern and determine the final parameters to be employed based on the evaluation values.

SUMMARY

According to an aspect of the present invention, there is provided at least one of an encoding apparatus, an encoding method, and an image capture apparatus.

According to another aspect of the present invention, there is provided an apparatus and method for suppressing image quality degradation, or reducing an amount of processing for determining parameters of an adaptive offset process.

According to another aspect of the present invention, there is provided an encoding apparatus comprising: a dividing unit that divides a target image included in an image into coding blocks; an encoding unit that encodes the target image including the coding blocks; a generating unit that generates a locally decoded image from the encoded target image; a filtering unit that applies a predetermined filtering to the locally decoded image; and a determination unit that determines, based on whether a predetermined condition is satisfied or not, whether a band offset process is applied to the locally decoded image or an edge offset process is applied to the locally decoded image.

According to another aspect of the present invention, there is provided a method comprising: dividing a target image included in an image into coding blocks; encoding the target image including the coding blocks; generating a locally decoded image from the encoded target image; applying a predetermined filtering to the locally decoded image; and determining, based on whether a predetermined condition is satisfied or not, whether a band offset process is applied to the locally decoded image or an edge offset process is applied to the locally decoded image.

According to another aspect of the present invention, there is provided an image capture apparatus comprising: an image capture unit that captures an image; and a dividing unit that divides a target image included in the image into coding blocks; an encoding unit that encodes the target image including the coding blocks; a generating unit that generates a locally decoded image from the encoded target image; a filtering unit that applies a predetermined filtering to the locally decoded image; and a determination unit that determines, based on whether a predetermined condition is satisfied or not, whether a band offset process is applied to the locally decoded image or an edge offset process is applied to the locally decoded image.

Further features and aspects of the present invention will become apparent from the following description of exemplary embodiments.

DESCRIPTION OF THE EMBODIMENTS

Exemplary embodiments, features, and aspects of the present invention will be described below with reference to the drawings.

First Exemplary Embodiment

Figure 1:
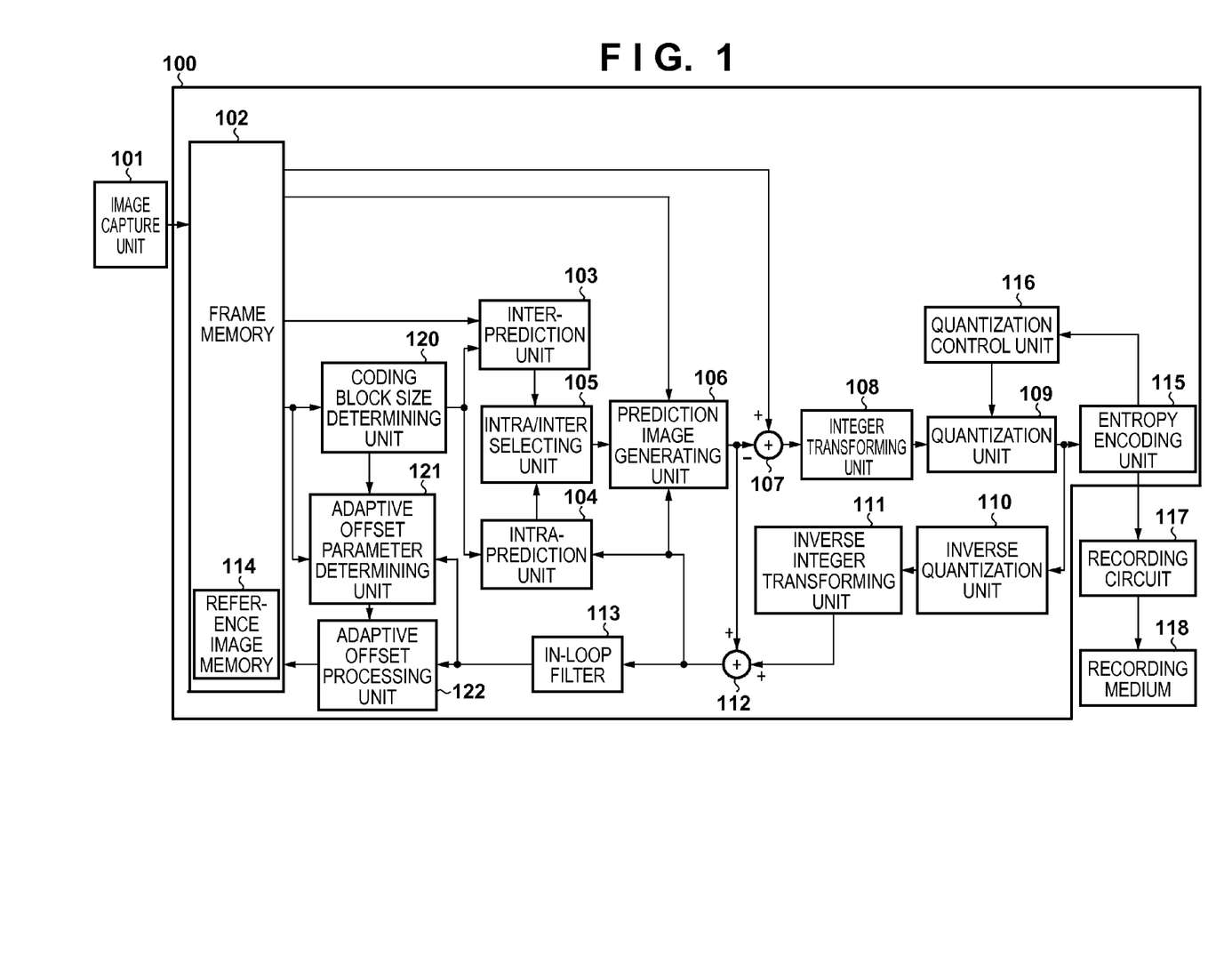
FIG. 1 is a block diagram illustrating an example of a configuration of an image capture apparatus including an image encoding apparatus 100 according to a first exemplary embodiment.

FIG. 1 is a block diagram illustrating an example of a configuration of an image capture apparatus including an image encoding apparatus 100 according to a first exemplary embodiment. The first exemplary embodiment will be described taking, as an example, an image encoding apparatus that implements the HEVC coding scheme. Also, in FIG. 1, constituent elements that are irrelevant to the first exemplary embodiment are either omitted or simplified.

The image capture apparatus shown in FIG. 1 includes the image encoding apparatus 100, an image capture unit 101 and a recording circuit 117, and is configured so that a recording medium 118 can be attached thereto. The image capture unit 101 includes a camera unit such as a lens, a CCD and the like, and is configured to acquire the plurality of image data corresponding to captured images.

A frame memory 102 of the image encoding apparatus 100 includes a reference image memory 114 that stores therein reference images for use in inter-prediction. The plurality of image data obtained by capturing an object with the image capture unit 101 is sequentially stored in the frame memory 102, and the plurality of image data is output in the order in which they are encoded.

The output image data is input into a coding block size determining unit 120 and divided into encoding target images (i.e., CTUs (Coding Tree Units). Each CTU is further divided into coding blocks (i.e., CUs (Coding Units)), which are used in a predictive encoding. An inter-prediction unit 103 reads reference image data in a motion search range from the reference image memory 114. Then, the inter-prediction unit 103 detects a motion vector based on a correlation between the image data of an encoding target CU input from the coding block size determining unit 120 and the reference image data, and notifies an intra/inter selecting unit 105 of the detected motion vector.

Meanwhile, an intra-prediction unit 104 accumulates reconstructed image data (corresponding to a locally decoded image that is obtained by decoding an encoding target image) output from an adder 112, which will be described later, and acquires data of the surrounding pixels of the encoding target CU. Then, the intra-prediction unit 104 selects an intra-prediction scheme based on a correlation between the image data of the encoding target CU input from the coding block size determining unit 120 and a plurality of intra-prediction image data generated from the data of the surrounding pixels of the encoding target CU. The intra-prediction unit 104 notifies the intra/inter selecting unit 105 of the determined intra-prediction scheme. The data of the surrounding pixels may be read from the frame memory 102.

The intra/inter selecting unit 105 acquires a result of processing of the inter-prediction unit 103 and a result of processing of the intra-prediction unit 104 so as to select a prediction scheme having, for example, a smaller difference value, and notifies a prediction image generating unit 106 of the selected prediction scheme.

The prediction image generating unit 106 generates a prediction image in accordance with the prediction scheme notified from the intra/inter selecting unit 105. If the prediction scheme is inter-prediction scheme, the intra/inter selecting unit 105 reads the corresponding data from the reference image memory 114 in accordance with prediction information such as the motion vector, and generates a prediction image. If the prediction scheme is intra-prediction scheme, the intra/inter selecting unit 105 generates prediction image data from the reconstructed image data output from the adder 112 in accordance with the intra-prediction scheme.

A subtracter 107 receives input of the image data of the encoding target CU read from the frame memory 102 and the prediction image data described above, and outputs pixel value difference data between the image of the encoding target CU and the prediction image to an integer transforming unit 108. The integer transforming unit 108 performs an integer transforming on the pixel value difference data. The integer transforming is performed on each integer transform block (or transform unit (TU)). A quantization unit 109 quantizes a transform coefficient generated as a result of the integer transform with the use of a quantization coefficient notified from a quantization control unit 116, and outputs the quantized transform coefficient to an entropy encoding unit 115.

The quantization control unit 116 controls, based on the notification of a code amount generated by the entropy encoding unit 115, the quantization coefficient such that the code amount (the bit rate of a stream) pre-designated by a controller is obtained.

The transform coefficient quantized by the quantization unit 109 is also input into an inverse quantization unit 110. The inverse quantization unit 110 inversely quantizes the input transform coefficient, and an inverse integer transforming unit 111 performs an inverse integer transforming process on the inversely quantized signal.

The adder 112 receives input of the data that has undergone the inverse integer transform and the prediction image data generated by the prediction image generating unit 106 so as to be added. The data obtained as a result of the addition serves as reconstructed image data (corresponding to a locally decoded image that is obtained by decoding an encoding target image), and is input into the prediction image generating unit 106 and used to generate intra-prediction image data. Also, the reconstructed image data is subjected to a process for reducing block noise caused by encoding, performed by an in-loop filter 113. The image data processed by the in-loop filter 113 is input into an adaptive offset processing unit 122. The adaptive offset processing unit 122 performs an adaptive offset process on the image data in accordance with adaptive offset processing parameters notified from an adaptive offset parameter determining unit 121. The image data that has undergone the adaptive offset process is stored in the reference image memory 114 as reference image data for use in inter-encoding. Details of the adaptive offset process will be given later.

The entropy encoding unit 115 performs entropy encoding on the quantized transform coefficient of the encoding target CU and various types of information such as division information, offset mode information and prediction scheme information, and outputs the resultant to the recording circuit 117 as a stream. The division information is information indicating how image data (corresponding to encoding target image) was divided into CUs by the coding block size determining unit 120. The offset mode information is information indicating a type of an adaptive offset process used by the adaptive offset processing unit 122 on a CTU-by-CTU basis.

The recording circuit 117 records the stream output from the entropy encoding unit 115 in the recording medium 118. The recording process may be performed after generation of a multiplexed stream obtained by multiplexing with audio data. Also, the entropy encoding unit 115 notifies the quantization control unit 116 of a code amount generated.

Adaptive Offset Process

The adaptive offset process will be described next in detail. The adaptive offset process in the HEVC coding scheme includes a band offset process and an edge offset process. Generally, the band offset process is said to be effective in the images of flat areas where the pixel value change is small. The edge offset process is said to be effective in areas such as edge areas where mosquito noise is likely to occur. A type of an adaptive offset process used is selected for each CTU, and the image encoding apparatus 100 determines, for each CTU, whether or not the band offset process is used, whether or not the edge offset process is used, or whether or not the adaptive offset process is performed.

The adaptive offset process can be performed independently on the luminance and the color difference. It is assumed here that in the luminance and the color difference, one pixel is composed of 8 bits, and the pixel value takes a value ranging from 0 to 255. It is also assumed that in the adaptive offset process, processing on the color difference is performed after processing on the luminance has been performed. Hereinafter, the processing on the luminance will be described as an example, but the same processing is performed on the color difference.

The band offset process will be described first. In the band offset process, a range of values that can be taken by the pixel value is divided into eight bands, the foremost band position to which an offset value is added is designated, and four offset values of four bands counted from the designated band position are designated. Then, a designated offset value is added to a pixel having a pixel value in the corresponding one of the four bands counted from the designated band position.

The band position of each pixel is represented by the following Equation (1).

$$\text{"Band position"} = \text{"pixel value"} \div 8 \text{ (the decimal point is rounded down)} \quad (1)$$

That is, if the pixel value is 0 to 7, the band position is 0, and if the pixel value is 8 to 15, the band position is 1.

The band positions in which an offset value can be designated are four bands counted from the designated band position. If the designated band position is represented by BP, offset values can be designated in the following four band positions: BP, BP+1, BP+2 and BP+3. The offset value of the band position BP is represented by OFF0, the offset value of the band position BP+1 is represented by OFF1, the offset value of the band position BP+2 is represented by OFF2, and the offset value of the band position BP+3 is represented by OFF3.

If the pixel value of a target pixel before the adaptive offset process corresponds to any one of the band positions BP, BP+1, BP+2 and BP+3, a process is performed to add the offset value of the corresponding band position to the pixel so as to generate a pixel that has undergone the band offset process.

Figure 2:
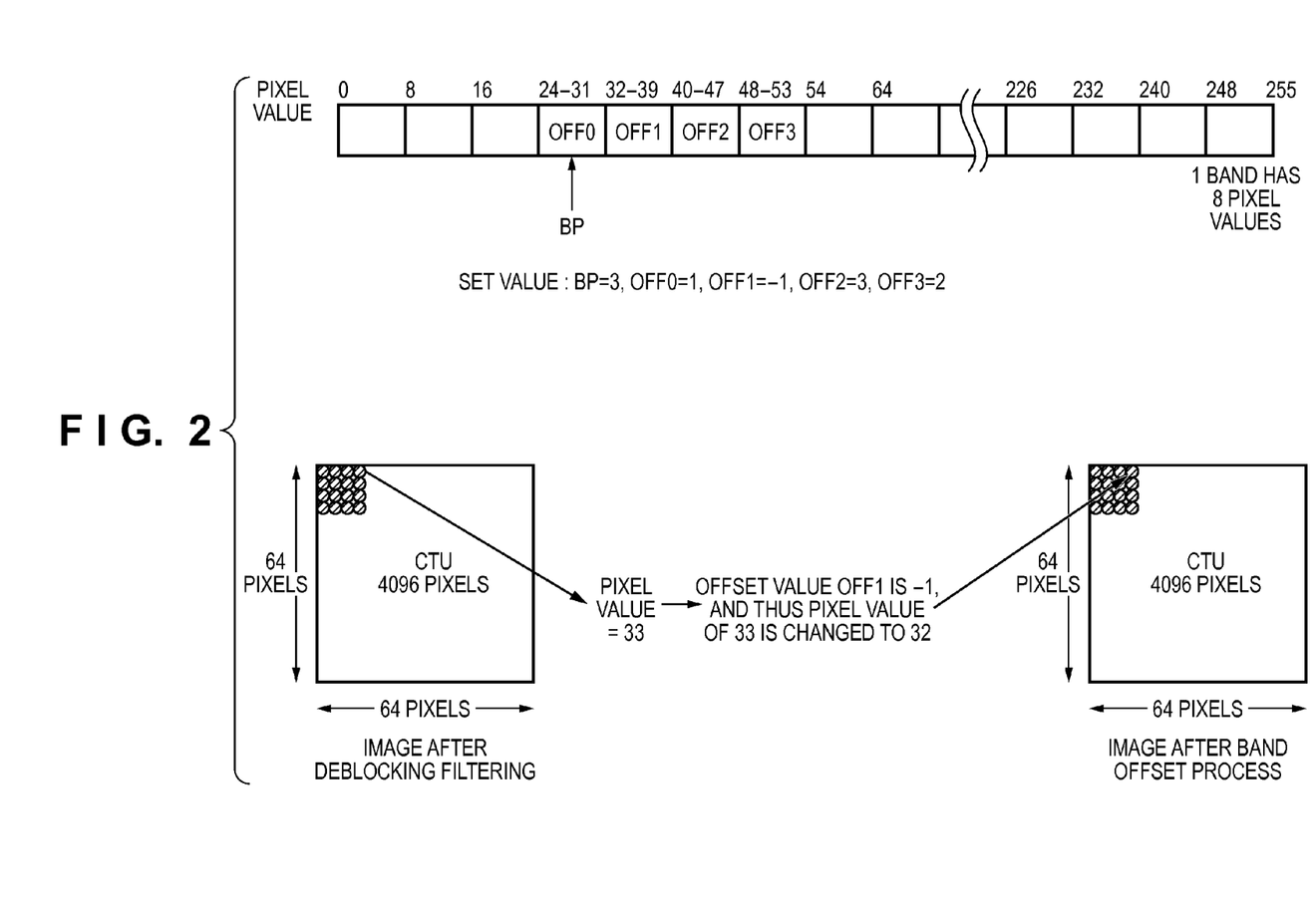
FIG. 2 is a diagram illustrating an example of a band offset process.

An example of the band offset process is shown in FIG. 2. It is assumed here that band position BP=3 (pixel value: 24 to 31). It is also assumed that the offset values are set as follows: OFF0=1, OFF1=−1, OFF2=3, and OFF3=2. This indicates that an offset value of 1 is designated in a range of pixel values from 24 to 31, an offset value of −1 is designated in a range of pixel values from 32 to 39, an offset value of 3 is designated in a range of pixel values from 40 to 47, and an offset value of 2 is designated in a range of pixel values from 48 to 55.

If, for example, the pixel value before the adaptive offset process is 33, the corresponding offset value is −1, and thus the pixel value is changed to 33 +(−1)=32. The pixel values of all of the pixels within the CTU are determined in the same manner. If the pixel value corresponds to any one of the four bands counted from the designated band position, a process is performed to add the corresponding offset value. If the pixel value does not correspond to any one of the four bands counted from the designated band position, the pixel value is not changed. The band offset process is performed in this way and ends.

The edge offset process will be described next. The edge offset process is classified into four categories based on the magnitude relationship of three pixels in total (i.e., a target pixel and two adjacent pixels), and a process is performed to add an offset value for each category. To be specific, designation of an edge direction designating the direction of adjacent pixels and designation of the offset values of four categories are performed.

Figure 3A:
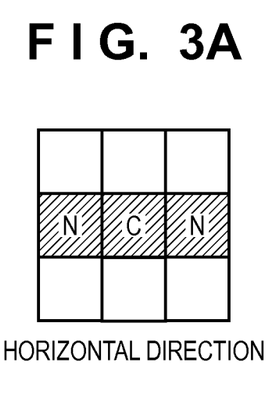
FIGS. 3A to 3D are diagrams illustrating four edge directions in an edge offset process.
Figure 3B:
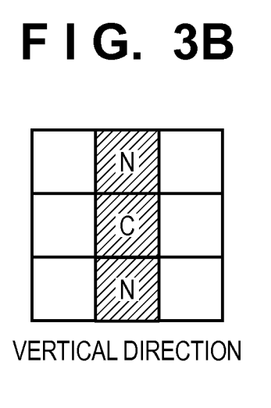
Figure 3C:
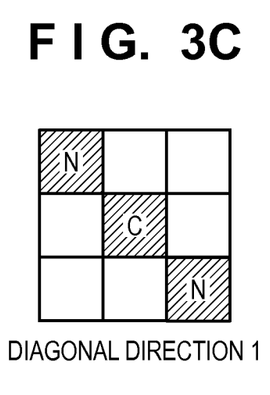
Figure 3D:
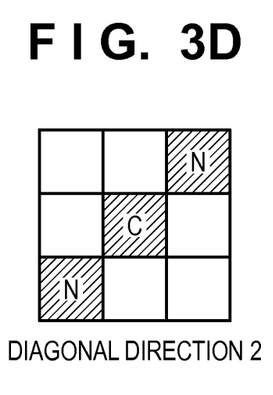

The edge direction will be described with reference to FIGS. 3A to 3D. A target pixel that is subjected to the edge offset process is represented by C, and the adjacent pixels in the edge direction are represented by N. As the edge direction, one of the following four edge directions: a horizontal direction shown in FIG. 3A, a vertical direction shown in FIG. 3B, a diagonal direction 1 shown in FIG. 3C, and a diagonal direction 2 shown in FIG. 3D is designated.

Figure 4A:
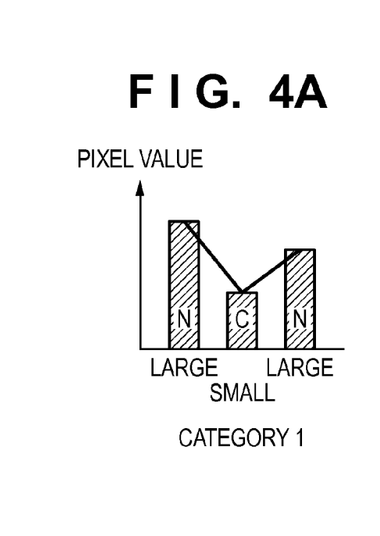
FIGS. 4A to 4D are diagrams illustrating four categories in the edge offset process.
Figure 4B:
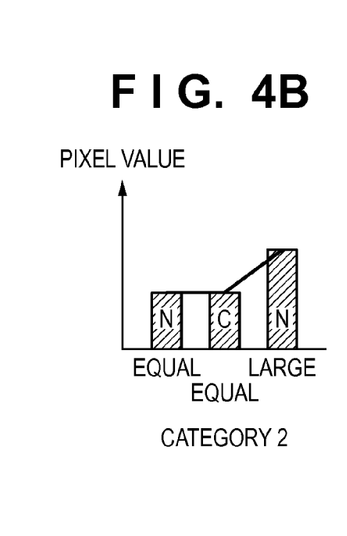
Figure 4C:
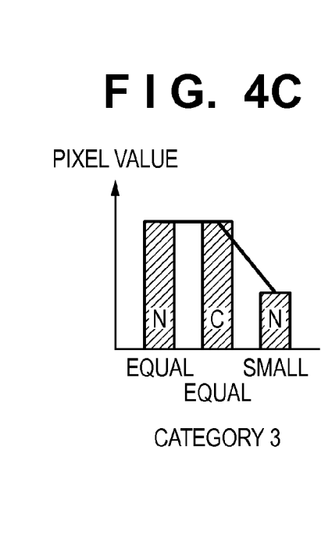
Figure 4D:
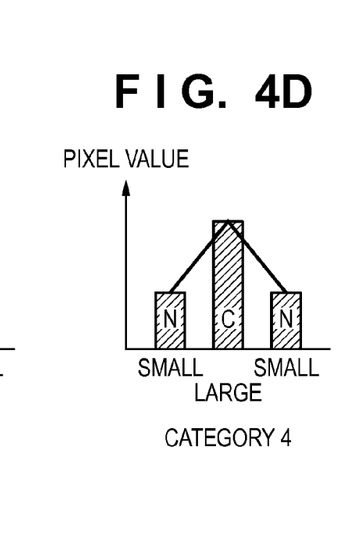

The category will be described with reference to FIGS. 4A to 4D. The category is determined for the designated edge direction based on the magnitude relationship of the pixel values of three pixels in total (i.e., an edge offset processing target pixel C and two adjacent pixels N). If the two adjacent pixels N have pixel values greater than that of the target pixel C, category 1 shown in FIG. 4A is selected. If one of the adjacent pixels N has a pixel value equal to that of the target pixel C, and the other adjacent pixel N has a pixel value greater than that of the target pixel C, category 2 shown in FIG. 4B is selected. If one of the adjacent pixels N has a pixel value equal to that of the target pixel C, and the other adjacent pixel N has a pixel value smaller than that of the target pixel C, category 3 shown in FIG. 4C is selected. If the two adjacent pixels N have pixel values smaller than that of the target pixel C, category 4 shown in FIG. 4D is selected.

In the edge offset process, offset values are designated for the four categories. If a pixel before the adaptive offset process corresponds to any one of the four categories based on the magnitude relationship of three pixels including the adjacent pixels in the designated edge direction, a process is performed to add the offset value designated for the corresponding category, and thereby a pixel after an edge offset processing pixel is generated. If the target pixel corresponds to none of the four categories, the target pixel is excluded from the edge offset process. The edge offset process is performed in this way and ends.

Determination of Adaptive Offset Parameter

Next is a description of operations of the adaptive offset parameter determining unit 121. The adaptive offset parameter determining unit 121 performs a parameter determining process by selecting either one of the band offset process and the edge offset process based on a total number of CUs included in a CTU output by the coding block size determining unit 120.

Figure 7:
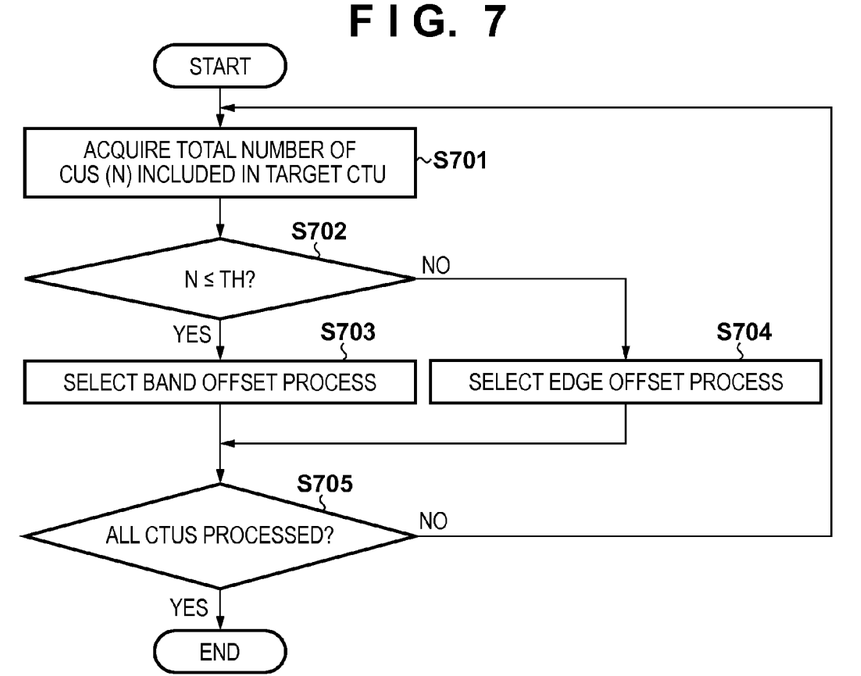
FIG. 7 is a flowchart illustrating a selecting process for selecting the band offset process or the edge offset process, which is performed by an adaptive offset parameter determining unit 121 in the first exemplary embodiment.

FIG. 7 is a flowchart illustrating a selecting process for selecting the band offset process or the edge offset process, which is performed by the adaptive offset parameter determining unit 121. In step S701, the adaptive offset parameter determining unit 121 acquires a total number of CUs (Coding Units) (N) included in a target CTU (Coding Tree Unit). By doing so, the adaptive offset parameter determining unit 121 can find how many CUs are included in the target CTU. In step S702, the adaptive offset parameter determining unit 121 determines whether or not the total number of CUs (N) included in the target CTU is less than or equal to a threshold value TH. If the total number of CUs included in the target CTU is less than or equal to the threshold value, in step S703, the adaptive offset parameter determining unit 121 selects the band offset process. If, on the other hand, the total number of CUs included in the target CTU is greater than the threshold value, in step S704, the adaptive offset parameter determining unit 121 selects the edge offset process.

After a selection has been made in step S703 or step S704, in step S705, the adaptive offset parameter determining unit 121 determines whether or not all of the CTUs have been processed. If not all of the CTUs have been processed, the adaptive offset parameter determining unit 121 returns to step S701, and the same processing is repeated by setting the next CTU as the target CTU.

Generally, the band offset process is effective in an image of a flat area where pixel value change is small. Also, a division of CTU is usually performed such that a region where the pixel value change is small constitutes a single CU. Accordingly, a CTU whose total number of CUs (N) is small is considered to be mostly a flat area. By utilizing these characteristics, in the first exemplary embodiment, the adaptive offset parameter determining unit 121 selects the band offset process if N≤TH, and selects the edge offset process if N>TH. By doing so, an amount of processing in the parameter determining process is reduced while suppressing the image quality degradation.

Figure 5:
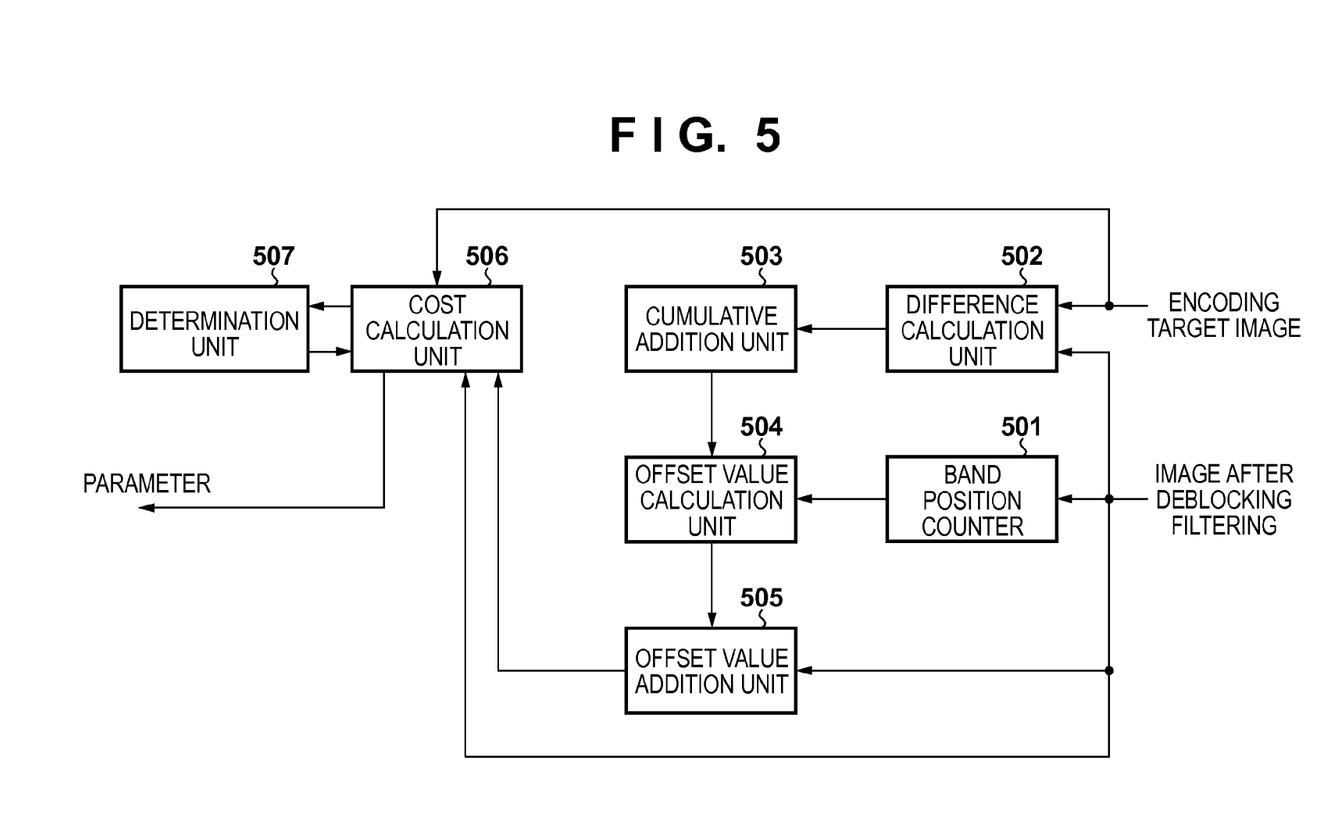
FIG. 5 is a block diagram illustrating a parameter determining process of the band offset process.

Although the details will be described with reference to FIG. 5, the adaptive offset parameter determining unit 121 may end up in determining that the band offset process is not to be performed despite the fact that the band offset process was selected in step S703. It means that if the band offset process is selected in step S703, the band offset process (not the edge offset process) is performed provided that the adaptive offset process is performed, but the band offset process is not necessarily performed. This applies to a case where the edge offset process is selected in step S704.

Figure 8:
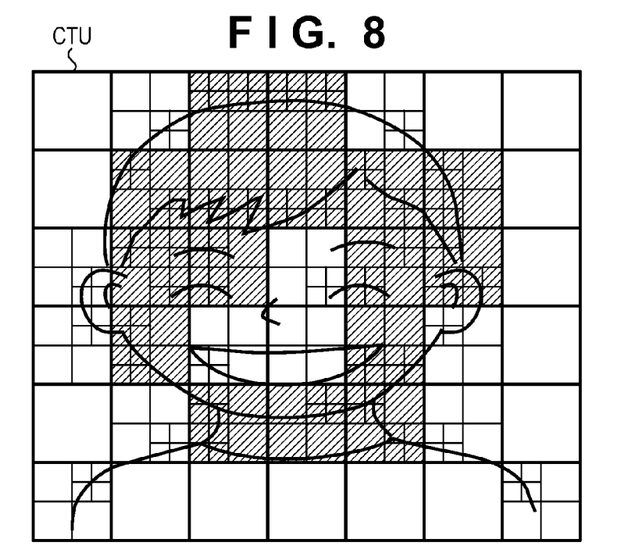
FIG. 8 is a diagram illustrating an example of a result obtained through the selecting process shown in FIG. 7.

FIG. 8 is a diagram illustrating an example of a result of the selecting process shown in FIG. 7. It is assumed here that the threshold value TH is 7 (TH=7). In the diagram, hatched CTUs are CTUs for which the edge offset process has been selected, and unhatched CTUs are CTUs for which the band offset process has been selected. As is clear from the diagram, the band offset process has been selected for a CTU mostly composed of flat area (or in other words, a CTU whose total number of CUs is smaller than a predetermined number).

The parameter determining process using the band offset process will be described next with reference to FIG. 5. The blocks shown in FIG. 5 are functional blocks mounted in the adaptive offset parameter determining unit 121. The parameter determining process includes a process of determining whether or not to perform the band offset process. The parameters of the adaptive offset process are encoded for each CTU, and thus the parameter determining process is performed on a CTU-by-CTU basis.

In the first exemplary embodiment, it is assumed that the adaptive offset parameter determining unit 121 uses an average difference value between a post-deblocking filtering image at each band position and the encoding target image as the offset value. Also, the adaptive offset parameter determining unit 121 performs cost calculation with a sum of absolute differences between the images that have undergone the band offset process at all band positions and the encoding target image, and uses a band position corresponding to the minimum cost as the band position of the band offset process.

First, the adaptive offset parameter determining unit 121 calculates an offset value for each band position. A band position counter 501 includes a counter for each band position, and is configured to check which band position each pixel corresponds to in the post-deblocking filtering image, and count a total number of pixels belonging to each band position. The total number of pixels of each band position is output to an offset value calculation unit 504.

A difference calculation unit 502 checks which band position each pixel corresponds to in the post-deblocking filtering image. Also, the difference calculation unit 502 calculates, for each pixel, a difference between the post-deblocking filtering image and the encoding target image, and outputs a set of the band position and the difference value to a cumulative addition unit 503.

The cumulative addition unit 503 performs a cumulative addition process of the difference values for each band position, and outputs a cumulatively added value of each band position to the offset value calculation unit 504. The offset value calculation unit 504 divides the cumulatively added value by the total number of pixels for each band position so as to calculate an average difference value per pixel. The offset value calculation unit 504 determines the average difference value calculated for each band position as the offset value of the corresponding band position. The offset value of each band position is output to an offset value addition unit 505.

Next, the adaptive offset parameter determining unit 121 performs cost calculation after the band offset process at all band positions. The offset value addition unit 505 sequentially designates each band position as the foremost band position, and performs the band offset process on the post-deblocking filtering image. That is, the offset value addition unit 505 adds the offset value determined in the offset value calculation unit 504 to the pixel values included in four bands counted from the designated foremost band position. The image that has undergone the offset value addition is output to a cost calculation unit 506.

The cost calculation unit 506 calculates a sum of absolute differences between the image that has undergone the offset value addition and the encoding target image with respect to all pixels, and determines the sum of absolute differences as the cost of the designated foremost band position. The cost calculation unit 506 calculates cost with respect to all foremost band positions sequentially designated by the offset value addition unit 505, and determines a foremost band position corresponding to the minimum cost as the foremost band position of the band offset process.

In this way, the band position (foremost band position) of the band offset process, the offset value and the corresponding cost are determined. The cost is sent to a determination unit 507.

Furthermore, the cost calculation unit 506 also calculates cost if the band offset process is not performed. To be specific, the cost calculation unit 506 calculates a sum of absolute differences between the post-deblocking filtering image and the encoding target image with respect to all pixels, and determines the sum of absolute differences as the cost if the band offset process is not performed. This cost is also sent to the determination unit 507.

The determination unit 507 determines whether or not the band offset process is to be performed. First, the determination unit 507 calculates image quality improvement cost, which is an index indicating how much the image quality will be improved if the band offset process is performed. The image quality improvement cost is obtained by subtracting the cost if the band offset process is performed from the cost if the band offset process is not performed. In other words, the image quality improvement cost is a value related to the results of comparison between the encoding target image and the locally decoded image before and after the band offset process.

If the band offset process is performed, the image encoding apparatus 100 needs to encode the band position and the offset value, which increases a code amount. The determination as to whether or not to perform the band offset process can be made by determining whether more image quality improvement effect can be obtained relative to the increase in the code amount. Because the increase in the code amount is almost constant, if the image quality improvement cost is greater than or equal to a predetermined threshold value, it is possible to determine that the image quality improvement effect is greater than the increase in the code amount. If it is determined that the image quality improvement cost is greater than or equal to the predetermined threshold value, the determination unit 507 determines that the band offset process is to be performed. If it is determined that the image quality improvement cost is less than the threshold value, the determination unit 507 determines that the band offset process is not to be performed.

The result determined by the determination unit 507 is sent to the cost calculation unit 506. The cost calculation unit 506 outputs encoding parameters according to the determined result. To be specific, if the result indicates that the band offset process is not to be performed, the cost calculation unit 506 outputs a flag indicating that the adaptive offset process is not to be performed, as the encoding parameters. If, on the other hand, the result indicates that the band offset process is to be performed, the cost calculation unit 506 outputs a flag indicating that the band offset process is to be performed, the band position and the offset values of four bands, as the encoding parameters.

In the manner described above, the adaptive offset parameter determining unit 121 can determine the band position and the offset value, which are parameters of the band offset process. Also, the adaptive offset parameter determining unit 121 can determine whether or not the band offset process is to be performed. With respect to CTUs for which the band offset process has been selected in the flowchart shown in FIG. 7, the band offset process is performed in the parameter determining process, and thus an amount of processing is reduced.

The method for determining band offset processing parameters and the method for determining whether or not to perform the band offset process are not limited to those described above.

Figure 6:
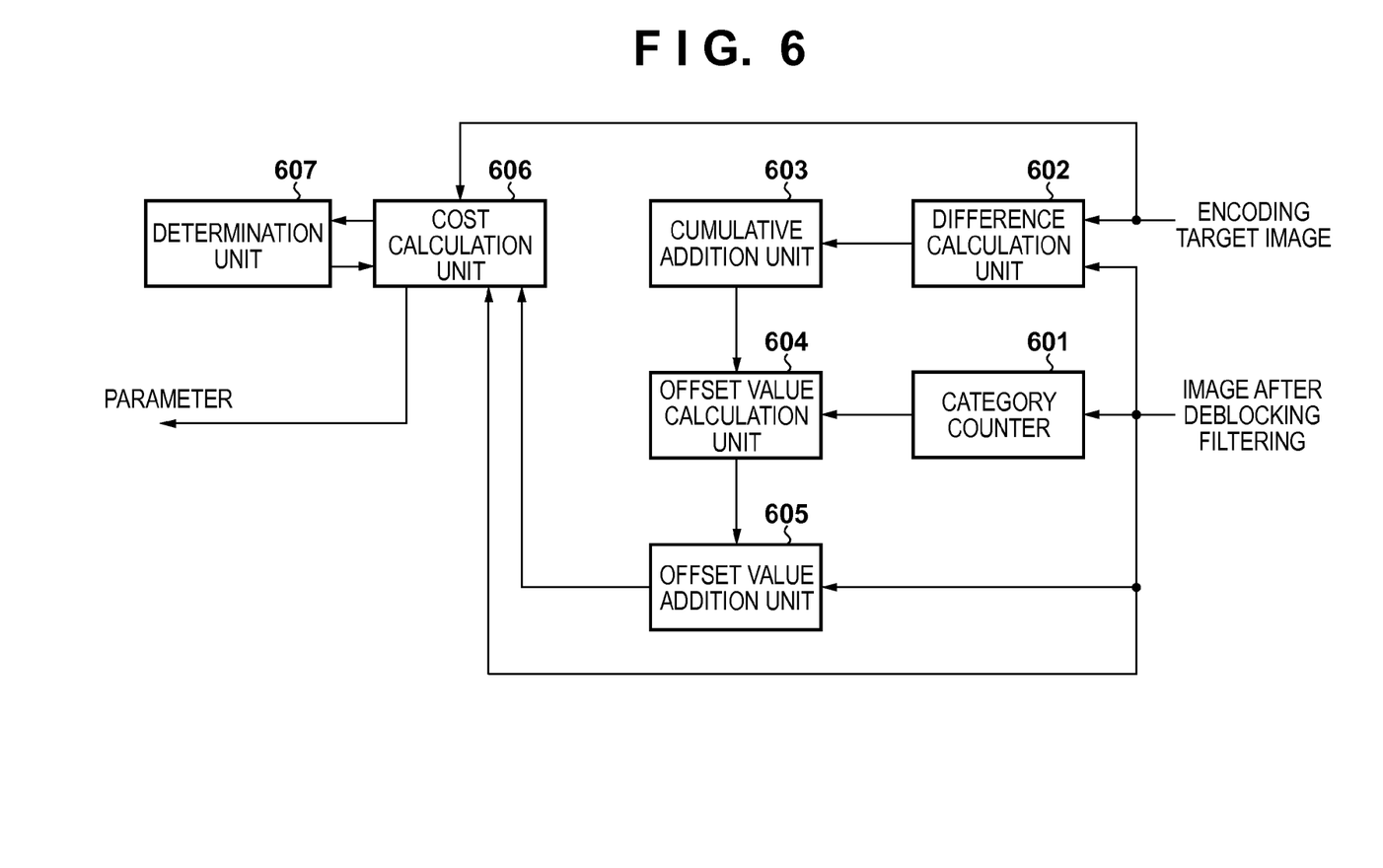
FIG. 6 is a block diagram illustrating a parameter determining process of the edge offset process.

The parameter determining process using the edge offset process will be described next with reference to FIG. 6. The blocks shown in FIG. 6 are functional blocks mounted in the adaptive offset parameter determining unit 121. The parameter determining process includes a process of determining whether or not to perform the edge offset process. The parameters of the adaptive offset process are encoded for each CTU, and thus the parameter determining process is performed on a CTU-by-CTU basis.

In the first exemplary embodiment, it is assumed that the adaptive offset parameter determining unit 121 uses an average difference value between a post-deblocking filtering image in each category in each edge direction and the encoding target image as the offset value. Also, the adaptive offset parameter determining unit 121 performs cost calculation with a sum of absolute differences between the images that have undergone the edge offset process in all edge directions and the encoding target image, and uses an edge direction corresponding to the minimum cost as the edge direction of the edge offset process.

First, the adaptive offset parameter determining unit 121 calculates an offset value for each category in each edge direction. A category counter 601 includes a counter for each category in each edge direction. That is, the category counter 601 includes counters corresponding to four categories shown in FIGS. 4A to 4D in each of four edge directions shown in FIGS. 3A to 3D. The category counter 601 checks, for each pixel in the post-deblocking filtering image, which category the pixel corresponds to with respect to all of the four edge directions, and counts a total number of pixels belonging to each category. The total number of pixels in each category in each edge direction is output to an offset value calculation unit 604.

A difference calculation unit 602 checks, for each pixel in the post-deblocking filtering image, which category the pixel corresponds to with respect to each edge direction. Also, the difference calculation unit 602 calculates, for each pixel, a difference between the post-deblocking filtering image and the encoding target image, and outputs a set of the edge direction, the category and the difference value to a cumulative addition unit 603.

The cumulative addition unit 603 performs a cumulative addition process of the difference values for each category in each edge direction, and outputs the cumulatively added value of each category in each edge direction to the offset value calculation unit 604. The offset value calculation unit 604 divides the cumulatively added value of each category in each edge direction by the total number of pixels so as to calculate an average difference value per pixel. The offset value calculation unit 604 determines the average difference value calculated for each category in each edge direction as the offset value of the corresponding edge direction and category. The offset value of each category in each edge direction is output to an offset value addition unit 605.

Next, the adaptive offset parameter determining unit 121 performs cost calculation after the edge offset process in all edge directions. The offset value addition unit 605 sequentially designates each edge direction, and performs the edge offset process on the post-deblocking filtering image. That is, the offset value addition unit 605 performs a process of adding the offset value determined by the offset value calculation unit 604 to the pixel value corresponding to each category of the designated edge direction. The image that has undergone the offset value addition is output to a cost calculation unit 606.

The cost calculation unit 606 calculates a sum of absolute differences between the image that has undergone the offset value addition and the encoding target image with respect to all pixels, and determines the sum of absolute differences as the cost of the edge direction. The cost calculation unit 606 calculates cost with respect to all of the edge directions designated sequentially by the offset value addition unit 605, and determines an edge direction corresponding to the minimum cost as the edge direction of the edge offset process.

In this way, the edge direction of the edge offset process, the offset value and the corresponding cost are determined. The cost is sent to a determination unit 607.

Furthermore, the cost calculation unit 606 also calculates cost if the edge offset process is not performed. To be specific, the cost calculation unit 606 calculates a sum of absolute differences between the post-deblocking filtering image and the encoding target image with respect to all pixels, and determines the sum of absolute differences as the cost if the edge offset process is not performed. This cost is also sent to the determination unit 607.

The determination unit 607 determines whether or not the edge offset process is to be performed. First, the determination unit 607 calculates image quality improvement cost, which is an index indicating how much the image quality will be improved if the edge offset process is performed. The image quality improvement cost is obtained by subtracting the cost if the edge offset process is performed from the cost if the edge offset process is not performed. In other words, the image quality improvement cost is a value related to the results of comparison between the encoding target image and the locally decoded image before and after the edge offset process.

If the edge offset process is performed, the image encoding apparatus 100 needs to encode the edge direction and the offset value, which increases a code amount. The determination as to whether or not to perform the edge offset process can be determined by determining whether more image quality improvement effect can be obtained relative to the increase in the code amount. Because the increase in the code amount is almost constant, if the image quality improvement cost is greater than or equal to a predetermined threshold value, it is possible to determine that the image quality improvement effect is greater than the increase in the code amount. If it is determined that the image quality improvement cost is greater than or equal to the predetermined threshold value, the determination unit 607 determines that the edge offset process is to be performed. If it is determined that the image quality improvement cost is less than the threshold value, the determination unit 607 determines that the edge offset process is not to be performed.

The result determined by the determination unit 607 is sent to the cost calculation unit 606. The cost calculation unit 606 outputs encoding parameters according to the determined result. To be specific, if the result indicates that the edge offset process is not to be performed, the cost calculation unit 606 outputs a flag indicating that the adaptive offset process is not to be performed, as the encoding parameters. If, on the other hand, the result indicates that the edge offset process is to be performed, the cost calculation unit 606 outputs a flag indicating that the edge offset process is to be performed, the edge direction and the offset value of each category as the encoding parameters.

In the manner described above, the adaptive offset parameter determining unit 121 can determine the edge direction and the offset value, which are parameters of the edge offset process. Also, the adaptive offset parameter determining unit 121 can determine whether or not the edge offset process is performed. With respect to CTUs for which the edge offset process has been selected in the flowchart shown in FIG. 7, the edge offset process is performed in the parameter determining process, and thus an amount of processing is reduced.

The method for determining edge offset processing parameters and the method for determining whether or not to perform the edge offset process are not limited to those described above.

As described above, according to the first exemplary embodiment, the image encoding apparatus 100 selects the band offset process or the edge offset process based on a total number of CUs included in a target CTU. The image encoding apparatus 100 selects the band offset process if a total number of CUs included in a target CTU is less than or equal to a threshold value, and selects the edge offset process if the total number of CUs included in the target CTU is greater than the threshold value.

It is thereby possible to reduce an amount of processing for determining parameters of the adaptive offset process while suppressing the image quality degradation.

The first exemplary embodiment has been described taking the HEVC coding scheme as an example, but the first exemplary embodiment is applicable to any coding scheme as long as the adaptive offset process can be performed.

Second Exemplary Embodiment

In the first exemplary embodiment, a configuration was described in which a band offset process or an edge offset process is selected based on a total number of CUs included in a target CTU. A second exemplary embodiment will be described using a configuration in which a band offset process or an edge offset process is selected based on a size of the smallest CU included in a target CTU. An image capture apparatus according to the second exemplary embodiment includes constituent elements similar to those described in the first exemplary embodiment (see FIG. 1), and thus, differences with respect to the first exemplary embodiment will be described in the second exemplary embodiment.

Figure 9:
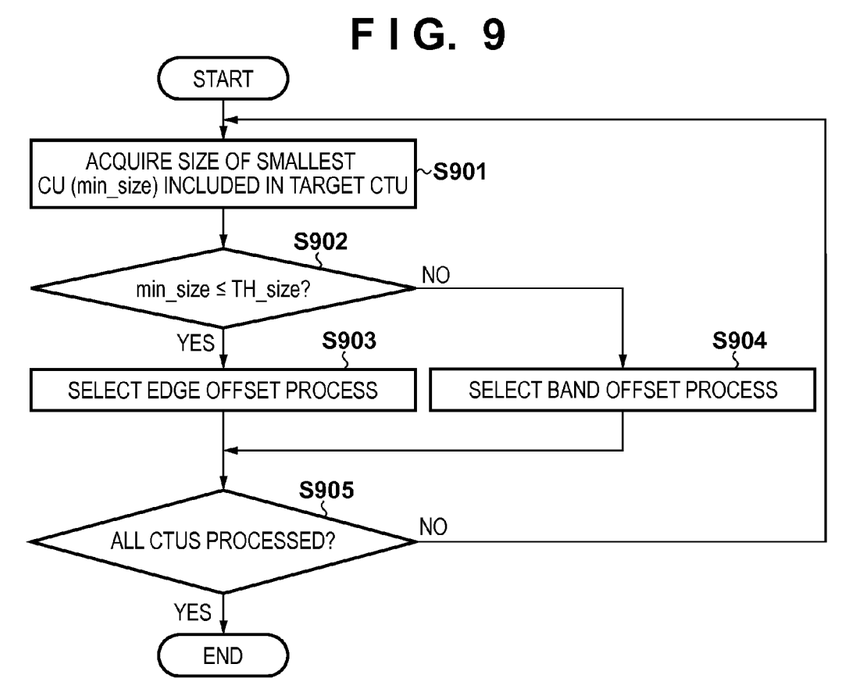
FIG. 9 is a flowchart illustrating a selecting process for selecting the band offset process or the edge offset process, which is performed by an adaptive offset parameter determining unit 121 in a second exemplary embodiment.

FIG. 9 is a flowchart illustrating a selecting process for selecting the band offset process or the edge offset process, which is performed by the adaptive offset parameter determining unit 121. In step S901, the adaptive offset parameter determining unit 121 acquires a size of the smallest CU (Coding Unit) (min_size) included in a target CTU (Coding Tree Unit). In step S902, the adaptive offset parameter determining unit 121 determines whether or not the size of the smallest CU (min_size) included in the target CTU is less than or equal to a pre-set threshold value TH size. If the size of the smallest CU included in the target CTU is less than or equal to the threshold value, in step S903, the adaptive offset parameter determining unit 121 selects the edge offset process. If, on the other hand, the size of the smallest CU included in the target CTU is greater than the threshold value, in step S904, the adaptive offset parameter determining unit 121 selects the band offset process.

After a selection has been made in step S903 or step S904, in step S905, the adaptive offset parameter determining unit 121 determines whether or not all of the CTUs have been processed. If not all of the CTUs have been processed, the adaptive offset parameter determining unit 121 returns to step S901, and the same processing is repeated by setting the next CTU as the target CTU.

Generally, the edge offset process is said to be effective in areas such as edge areas where mosquito noise is likely to occur. Also, dividing a CTU into CUs is usually performed such that a region where the pixel value change is small constitutes a single CU. Accordingly, a CTU having a small CU is considered to have an edge area. By utilizing these characteristics, in the second exemplary embodiment, the adaptive offset parameter determining unit 121 selects the edge offset process if min_size≤TH_size, and selects the band offset process if min_size>TH_size. By doing so, a type of an offset process that is likely to be effective for the target CTU is performed for the parameter determining process, and thus an amount of processing in the parameter determining process is reduced while suppressing the image quality degradation.

As in the first exemplary embodiment, the adaptive offset parameter determining unit 121 may end up in determining that the edge offset process is not to be performed despite the fact that the edge offset process was selected in step S903. Accordingly, if the edge offset process is selected in step S903, the edge offset process (not the band offset process) is performed provided that the adaptive offset process is performed, but the edge offset process is not necessarily performed. This applies to a case where the band offset process is selected in step S904.

Figure 10:
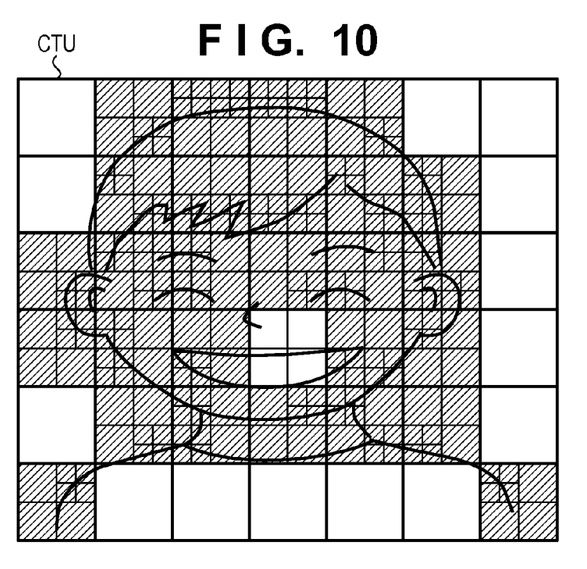
FIG. 10 is a diagram illustrating an example of a result obtained through the selecting process shown in FIG. 9.

FIG. 10 is a diagram illustrating an example of a result obtained by the selecting process shown in FIG. 9. It is assumed here that a size of CTU is 64×64, and the threshold value TH size is 16×16. In the diagram, hatched CTUs are CTUs for which the edge offset process has been selected, and unhatched CTUs are CTUs for which the band offset process has been selected. As is clear from the diagram, the edge offset process has been selected for CTUs having an edge area (or in other words, CTUs whose size of minimum CU is smaller than a predetermined size).

As described above, according to the second exemplary embodiment, the image encoding apparatus 100 selects the band offset process or the edge offset process based on a size of the smallest CU included in a target CTU. The image encoding apparatus 100 selects the edge offset process if a size of the smallest CU included in a target CTU is less than or equal to a threshold value, and selects the band offset process if the size of the smallest CU included in the target CTU is greater than the threshold value.

It is thereby possible to reduce an amount of processing for determining parameters of the adaptive offset process while suppressing the image quality degradation.

The second exemplary embodiment has been described taking the HEVC coding scheme as an example, but the second exemplary embodiment is applicable to any coding scheme as long as the adaptive offset process can be performed.

Third Exemplary Embodiment

At least one of the various functions, processes, and methods described in the first and second exemplary embodiments can be achieved using a program. Hereinafter, in a third exemplary embodiment, a program for realizing at least one of the various functions, processes, and methods described in the first and second exemplary embodiments will be referred to as a "program X". Further, in the third exemplary embodiment, a computer for executing the program X will be referred to as a "computer Y". Examples of the computer Y include a personal computer, a microcomputer, and a central processing unit (CPU).

At least one of the various functions, processes, and methods described in the first and second exemplary embodiments can be realized by the computer Y executing the program X. In this case, the program X is supplied to the computer Y via a computer readable storage medium. A computer readable storage medium according to the third exemplary embodiment includes at least one of a hard disk device, a magnetic storage device, an optical storage device, a magneto-optical storage device, a memory card, a read only memory (ROM), and a random access memory (RAM). Further, the computer readable storage medium according to the third exemplary embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2013-273180, filed Dec. 27, 2013, which is hereby incorporated by reference herein in its entirety.

What is claimed is:

1. An encoding apparatus comprising:
a dividing unit that divides a target image included in an image into coding blocks;
an encoding unit that encodes the target image including the coding blocks;
a generating unit that generates a locally decoded image from the encoded target image;
a filtering unit that applies a predetermined filtering to the locally decoded image; and
a determination unit that determines, based on a number of the coding blocks included in the target image, whether a band offset process is applied to the locally decoded image o edge offset process is applied to the locally decoded image.

2. An encoding a apparatus comprising:
dividing unit that divides a target image included in an image into coding blocks;
an encoding unit that encodes the target image including the coding blocks;
a generating unit that generates a locally decoded image from the encoded target image;
a filtering that applies predetermined filtering to the locally decoded image; and
a determination unit that determines, based on a size of smallest coding block included in the target image, whether a band offset process is applied to the locally decoded image or an edge offset process is applied to the locally decoded image.

3. A method comprising:
dividing a target image included in an image into coding blocks;
encoding the target image including the coding blocks;
generating a locally decoded image from the encoded target image;
applying a predetermined filtering to the locally decoded image; and
determining, based on a number of the coding blocks included in the target image, whether a band offset process is applied to the locally decoded image or an edge offset process is applied to the locally decoded image.

4. A method comprising:
dividing a target image included in an image into coding blocks;

encoding the target image including the coding blocks;

generating a locally decoded image from the encoded target image;

applying a predetermined filtering to the locally decoded image; and determining, based on a size of smallest coding block included in the target image, whether a band offset process is applied to the locally decoded image or an edge offset process applied to the locally decoded image.

5. A non-transitory storage medium that stores a program for causing a computer to execute a method comprising:

dividing a target image included in an image into coding blocks;

encoding the target image including the coding blocks;

generating a locally decoded image from the encoded target image;

applying a predetermined filtering to the locally decoded image; and determining, based on a number of the coding blocks included in the et image, whether a band offset process is applied to the locally decoded image or an edge offset process is applied to the locally decoded image.

6. An image capture apparatus comprising:

an mage capture unit that captures an image; and a dividing unit that divides a target image included in the image into coding blocks;

an encoding unit that encodes the target image including the coding blocks;

a generating unit that generates a locally decoded image from the encoded target image;

a filtering unit that applies a predetermined filtering to the locally decoded image; and a determination unit that determines, based on a number of coding blocks included in the target image, whether a band offset process is applied to the locally decoded image or an edge offset process is applied to the locally decoded image.

7. An image capture apparatus comprising:

an image capture unit that captures an image;

a dividing unit that divides a target image included in the image into coding blocks;

an encoding unit that encodes the target image included in the image into coding blocks;

generating unit that generates a locally decoded image from the encoded target image;

a filtering unit that applies a predetermined filtering to the locally decoded image; and a determination unit that determines, based on a size of smallest coding block included in the target image, whether a band offset process is applied to the locally decoded image or an edge offset process is applied to the locally decoded image.

8. The encoding apparatus according to claim 1, wherein the number of the coding blocks included in the target image is louver when the determination is that the band offset process s applied to the locally decoded image than when the determination is that the edge offset process is applied to the locally decoded image.

9. The encoding apparatus according to claim 1, wherein the coding blocks are Coding Units (CU) included in the target image as a Coding Tree Unit (CTU).

10. The encoding apparatus according to claim 2, wherein the size of the smallest coding block included in the target image is smaller when the determination is that the edge offset process is applied to the locally decoded image than when the determination is that the band offset process is applied to the locally decoded image.

11. The encoding apparatus according to claim 2, wherein the coding blocks are Coding Units (CU) included in the target image as a Coding tree Unit (CTU).

12. A no-transitory storage medium that stores a program for causing a computer to execute a method comprising:

dividing a target image included in an image into coding blocks;

encoding the target image including the coding blocks;

generating a locally decoded image from the encoded target image;

applying a predetermined filtering to the locally decoded image; and determining, based on a size of smallest coding block included in the target image, whether a band offset process is applied to the locally decoded image or an edge set process is applied to the locally decoded image.

* * * * *